United States Patent [19]

Ishige

[11] Patent Number: 4,549,841
[45] Date of Patent: Oct. 29, 1985

[54] CONTAINER STORAGE SHED INSTALLATION

[75] Inventor: Ryohei Ishige, Hiraki, Japan
[73] Assignee: Hitachi, Ltd., Tokyo, Japan
[21] Appl. No.: 444,386
[22] Filed: Nov. 26, 1982

[30] Foreign Application Priority Data

Dec. 2, 1981 [JP] Japan .............................. 56-192927

[51] Int. Cl.[4] .............................................. B65G 1/20
[52] U.S. Cl. ................................... 414/282; 294/81.1
[58] Field of Search ............... 414/266, 267, 281, 282, 414/286; 294/67 R, 67 DA, 81 R, 81 SF

[56] References Cited

U.S. PATENT DOCUMENTS 3,543,952 12/1970 Young ................................. 414/139
3,892,436 7/1974 Fathauer ........................ 294/81 SF

*Primary Examiner*—Robert G. Sheridan
*Attorney, Agent, or Firm*—Antonelli, Terry & Wands

[57] ABSTRACT

A shed for storing containers in a three-dimensional system essentially including rails laid on the floor, a crane movably supported on the rails, an elevating member on the crane for vertical elevatory movement, a spreader frame mounted on the elevating member for movement in a horizontal direction, brackets on the spreader frame capable of moving vertically, twist lock pins each twistably attached to one of the brackets, three-dimensional shelves arranged on the floor along the rails, and guides located horizontally on each of the shelves. The spreader frame is thrust from the elevating member toward one of the shelves, and the brackets are moved downwardly on to a container on the shelf while supporting the spreader frame by guides mounted on the shelf, to bring the twist lock pins into engagement with the container. Then the brackets are moved upwardly to lift the container from the shelf and the spreader frame is returned to the elevating member to thereby remove the container from the shelf by the crane. A container can be placed on one of the shelves by the crane by reversing the process described above.

2 Claims, 11 Drawing Figures 4,549,841

CONTAINER STORAGE SHED INSTALLATION

BACKGROUND OF THE INVENTION

This invention relates to storage sheds for containers, and more particularly it is concerned with a container storage shed of the type in which containers are placed on and removed from shelves by means of a crane.

In, for example, U.S. Pat. No. 3,543,952, a container storage shed is proposed wherein shelves, having a plurality of container storing zones arranged vertically and horizontally are equipped with a movable crane including an elevating member provided with a truck having piston-cylinder means for vertically moving a spreader frame provided with container hitching levers for pivotal movement in a horizontal direction. The shelves have guide rails for the truck secured thereto. When it is desired to remove a container from the shelf, the crane is moved together with the elevating member to the front of the zone in which the container of interest is located. Then the truck is transferred from the elevating member to the rails, and the spreader frame is positioned above the container. Thereafter, the piston-cylinder means is actuated to move the spreader frame downwardly to a position above the container. The container hitching levers are pivotally moved and hitched on to the container, and the piston-cylinder means is actuated to lift the spreader frame to hang the container. The truck is transferred from the guide rails to the elevating member to move the container to the crane. The container is moved to its destination by the crane which travels to the destination while the elevating member is vertically moved. The process described hereinabove is reversed when the container is placed on the shelf.

In the prior art, the crane must be supported in its entirety by the shelf, so that the shelves have an increased strength and this is uneconomical. When the truck is transferred from the elevating member to the shelf, it is completely separated from the elevatory member. This raises the problem that difficulties are experienced in permitting the truck to negotiate the gap between the elevating member and to the shelf and move on to the guide rails without any trouble. The truck is subjected to high shocks when moved on to the guide rails, so that it is impossible to operate the truck at high speed. Thus, the operation of placing a container on the shelf and removing the same therefrom is time-consuming and uneconomical. Moreover the levels for hitching a container and moving the same in a pivotal movement in a horizontal direction makes it necessary to provide the shelf with a space for moving the lever in a horizontal direction in addition to the space for moving the spreader frame in a vertical direction. This involves a low space efficiency and makes the system uneconomical because the zone for storing the container on the shelf is increased. In the layout of the prior art, the truck travels longitudinally of the crane thereby making it impossible to perform an operation of placing the container on the shelf and removing the same therefrom at high speed because it is time-consuming to position the spreader frame above the container.

In another prior art construction, a spreader frame is extended from the elevating member of the crane supported by a shelf toward the shelf to enable the spreader frame to support a container. In this system, the spreader frame is not completely separated from the elevating member, so that the disadvantage of difficult negotiation of the gap between the elevating member and the shelf is eliminated. In this prior art system, the container is supported on the spreader frame extending from the elevating member and lifted, so that a large moment of rotation would be applied to the elevating member and the spreader frame, thereby causing a high load to be applied to the crane. This is uneconomical because the crane would have to have a greatly increased strength.

SUMMARY OF THE INVENTION

This invention has been developed for the purpose of avoiding the disadvantages of the prior art. Accordingly the invention has as its object the provision of a container storage shed installation having shelves of compact size to render the installation economical, wherein a load applied to the container support shelves and the crane for placing a container on one of the shelves and removing the same therefrom is reduced and prompt operation can be performed when the installation is used.

According to the invention, there is provided a container storage shed installation for storing containers in a three-dimensional system comprising rails laid on the floor, a crane movably supported on the rails, an elevating member on the crane for vertical elevating movement, a spreader frame mounted on the elevating member for movement in a horizontal direction, brackets on the spreader frame capable of moving vertically, twist lock pins each twistably attached to one of the brackets, three-dimensional shelves arranged on the floor along said rails, and guides located horizontally on each of the shelves.

DETAILED DESCRIPTION

Figure 1:
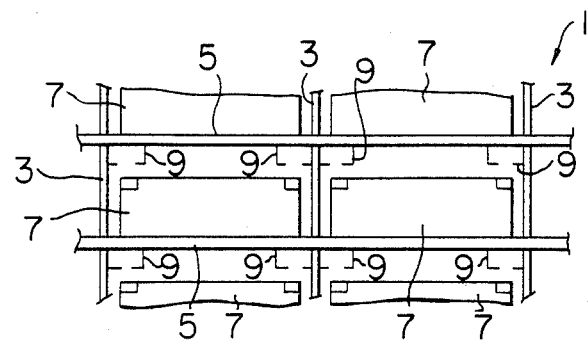
FIG. 1 is a front view of the shelves of one embodiment of the container storage shed installation in accordance with the invention.

Preferred embodiments of the invention will now be described by referring to the drawings.

Referring now to the drawings wherein like reference numerals are used throughout the various views to designate like parts and, more particularly, to FIG. 1, according to this Figure, a shelf generally designated by the reference numeral 1 comprises a vertical frame 3 and a horizontal frame 5 and has an inlet and outlet opening for a container enclosed by the vertical frame 3 and the horizontal frame 5. The horizontal frame 5 has L-shaped guide rails 9 secured thereto.

Figure 2:
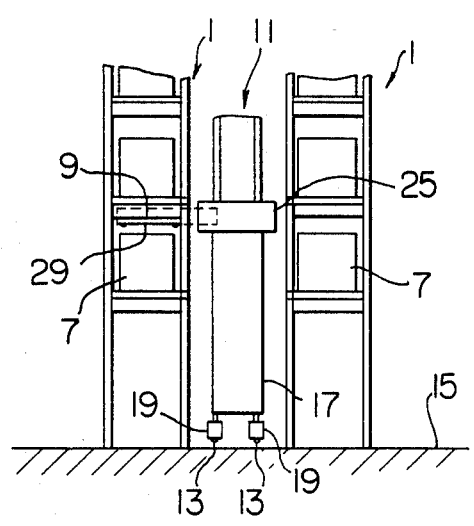
FIG. 2 is a schematic view of the first embodiment shown in FIG. 1, showing the arrangement of the shelves as viewed from one side thereof in relation to the crane.

Referring to FIG. 2, the shelves 1 are arranged on a floor 15 along rails 13 and located in an upright position on opposite sides of a crane generally designated by the reference numeral 11.

Figure 3:
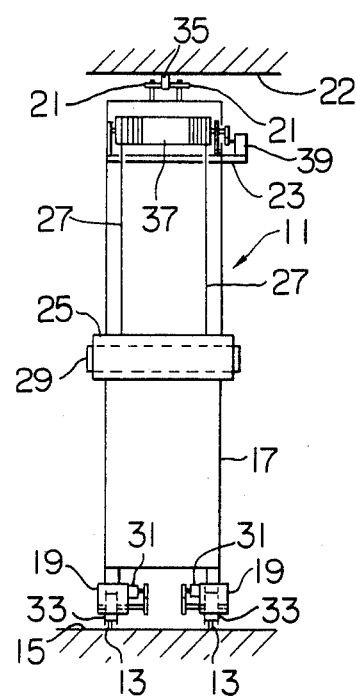
FIG. 3 is a view of the crane in its entirety of the first embodiment shown in FIGS. 1 and 2.

The rails 13 are laid on the floor 15 for supporting thereon the crane 11 which comprises, as shown in FIG. 3, a vertically elongated frame 17, travelling means 19 on a lower portion of the frame 17, guide wheels 21 on an upper portion of the frame 17 extending horizontally, a winch 23 on the frame 17, ropes 27 depending from the winch 23 and connected to an elevating member 25, and a spreader 29 supported on the elevating member 25 for movement in a horizontal direction.

Figure 5:
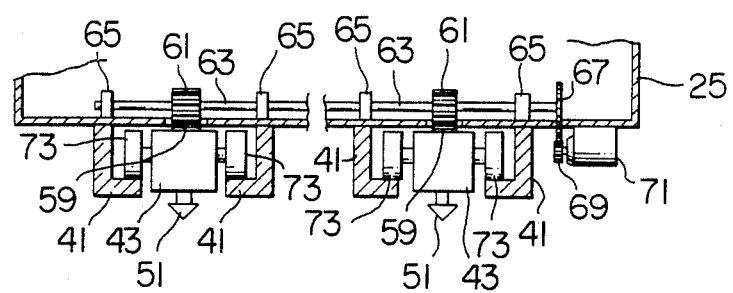
FIG. 5 is a cross sectional view taken along the line V—V in FIG. 4.
Figure 6:
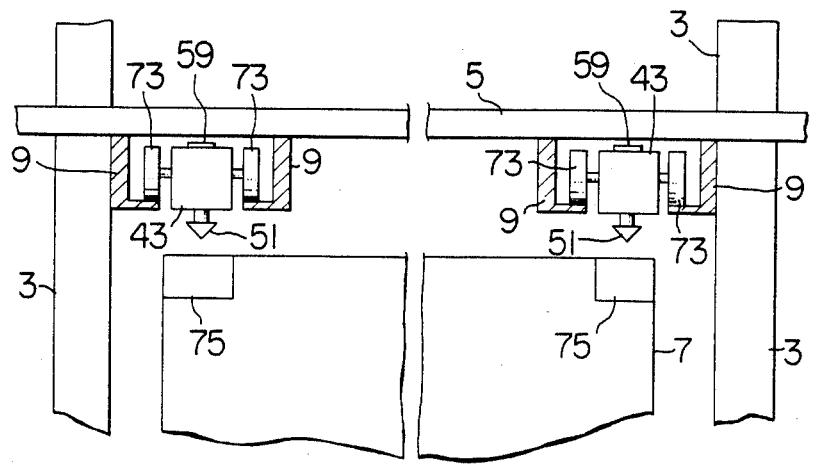
FIG. 6 is a cross sectional view taken along the line VI—VI in FIG. 4.

The travelling means 19 includes moving wheels 33 rotated by a motor 31 for movement on the rails 9. The guide wheels 21 hold therebetween a guide plate 35 secured to a ceiling 22 and extending in the same direction as the rails 9. The winch 23 includes a drum 37 having the ropes 27 wound thereon, and a motor 39 for rotating the drum 37. As shown in FIG. 5, the elevating member 25 has L-shaped guide rails 41 secured to the underside thereof.

Figure 7:
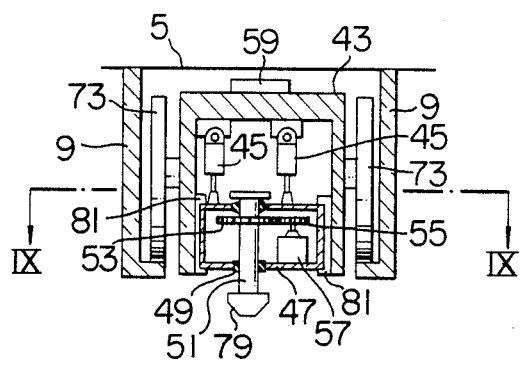
FIG. 7 is a partial vertical cross sectional view of the embodiment shown in FIG. 6.

As shown in FIG. 7, the spreader 29 includes a spreader frame 43, brackets 47 suspended from the spreader frame 43 by piston-cylinder means 45, and twist lock pins 51 each rotatably supported by a bearing 49 from one of the brackets 47. The twist lock pin 51 has secured thereto a gear 53 in meshing engagement with another gear 55 secured to the rotary shaft of a motor 57 which is secured to the bracket 47.

As shown in FIGS. 4–7, the spreader frame 43 has secured to its upper side surface a rack 59 having upwardly facing teeth in meshing engagement with a pinion 61 secured, as shown in FIG. 5, to a rotary shaft 63 journalled on bearings 65 secured to the elevating member 25. The rotary shaft 63 has, as shown in FIG. 5, secured to its end portion a gear 67 in meshing engagement with another gear 69 secured to a rotary shaft of a motor 71 which, in turn, is secured to the elevatory member 25.

The spreader frame 43 has, as shown in FIG. 5, rotatably mounted thereon guide rollers 73 supported on guide rails 41.

Figure 8:
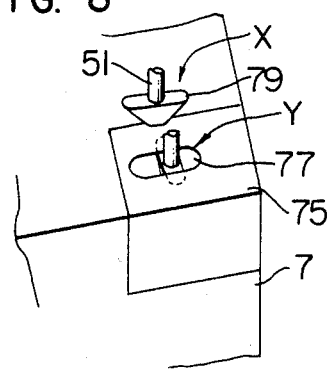
FIG. 8 is a partial perspective view of the embodiment shown in FIGS. 1-7, showing the twist lock pin in relation to a container.

The container 7 has secured to each of the four corners thereof a corner metal member 75 which is formed, as shown in FIG. 8, at its upper portion with a slot 77 of the same shape as a lock portion 79 of the twist lock pin 51.

The operation for removing the container 7 from the shelf 1 in the embodiment of the construction described hereinabove is as follows.

As the moving wheels 33 are rotated by the motor 31, the crane 11 travels on the rails 13 along the shelves 1. With the guide plate 51 held between the guide wheels 21, the frame 17 is prevented from falling. Simultaneously as the crane 11 travels, the drum 37 is rotated by the motor 39 to pay out the ropes 27 therefrom or wind same thereon to move the elevating member 25 in the vertical direction. By a combination of these horizontal and vertical movements of the members described, the elevating member 25 is positioned in front of a zone in which the container 7 to be removed from the shelf 1 is located.

Then the motor 71 is actuated to transmit the rotation thereof to the rotary shaft 63 through the gears 69 and 67, thereby rotating the pinion 61 to move the rack 59 in the horizontal direction. This causes the spreader frame 43 unitary with the rack 59 to be thrust out of the elevating member 25 toward the shelf 1 on the elevating member 25, the guide rollers 73 move in rolling movement on the guide rails 41.

Figure 4:
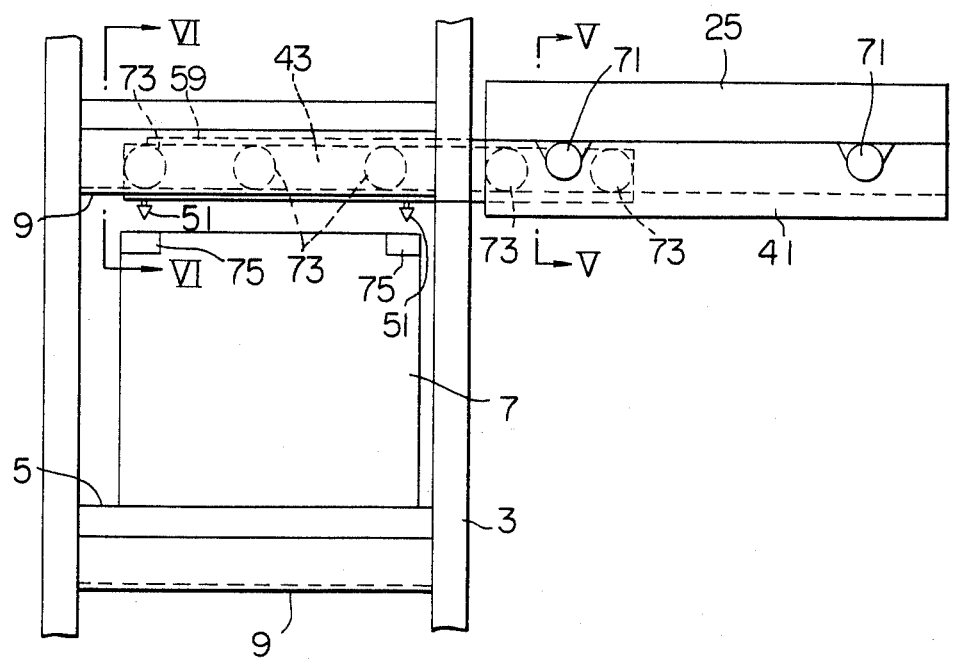
FIG. 4 is a view, on an enlarged scale, of the embodiment shown in FIGS. 1, 2 and 3, showing the spreader frame shown in FIG. 2 in relation to the container on the shelf.

Further thrusting movement of the spreader frame 43 toward the shelf 1 on the left side results in the guide rollers 73 being transferred to the guide rails 9 on the shelf 1 to allow the guide rollers 73 to move in rolling movement thereon. The movement of the spreader frame 43 is temporarily interrupted as the motor 71 is deactuated as the twist lock pins 51 reach points above the corner metal members 75. At this time, some of the guide rollers 73 are, as shown in FIG. 4, supported on the guide rails 9 while the rest of the guide rollers 73 are supported on the guide rails 41.

Then the piston-cylidner means 45 is extended downwardly to move the brackets 47 downwardly. As the brackets 47 move downwardly, the twist lock pins 51 also move downwardly in a condition generally designated by the reference character X in FIG. 8, to bring a lock portion 79 into engagement in each slot 77. Thereafter, the motor 57 is actuated to transmit its rotation to the twist lock pins 51 through the gears 55 and 53. This causes the twist lock pins 51 to move in a rotational movement so as to assume the position generally designated by the reference character Y, so that the twist lock pins 51 are locked and prevented from being from the slots 77. The motor 57 is deactuated when the twist pins 51 have roated through 90 degrees.

The piston-cylinder means 45 is actuated to move the brackets 47 upwardly. The twist lock pins 51 are hitched on to the container 7 to lift the latter by the spreader 29. The load of the container 7 is carried by the guide rails 9 through the guide rollers 73. Thus, the load of the container 7 is prevented from acting as a moment tending to cause the elevating member 25 to tumble even if the spreader 29 in a condition in which it extends from the elevating member 25, lifts the container 7, so that the safety of the operation is assured.

Then the motor 71 is actuated to rotate in a direction opposite the direction in which it was rotated to thrust the spreader 29 toward the shelf 1. This causes the guide rollers 73 to return from the guide rails 9 to the guide rails 41, to move the spreader frame 43 back to the elevating member 25. This allows the container 7 to be moved back to the elevating member 25 while being suspended from the spreader 29, so that the container 7 is thrust downwardly from the shelf 1 to a point below the elevating member 25.

When the spreader frame 43 is thrust toward the shelf 1, a portion thereof is engaged by the guide rails 41 through the guide rollers 73. This keeps the guide rails 9, in coincidence with the guide rails 41, in position when the spreader frame 43 is moved back to the elevating member 25, so that the shock force suffered by the spreader frame 43 is reduced as the guide-rollers 73 are transferred from the guide rails 9 to the guide rails 41.

When the container 7 has cleared the shelf 1, the motor 71 is deactuated and the container 7 is moved to a desired point on the ground. In this operation, the motor 31 is actuated to rotate the wheels 33 to move the crane 11 on the rails 13 while at the same time the motor 39 is actuated to rotate the drum 37 to move the elevating member 25 in the vertical direction.

Upon the container 7 being placed on the ground at the desired point, the motor 57 is actuated to rotate the twist lock pins 51 through 90 degrees. Then the piston-cylinder means 45 is actuated or the elevating member 25 is lifted by means of the winch 23, to thereby release the twist lock pins 51 from engagement in the slots 77 at the corner metal members 75. This completes the operation of removing the container 7 from the shelf 1.

The container 7 can be placed on the shelf 1 by reversing the aforesaid operation of removing the container 1 from the shelf 1. When the shelf 1 on the right side of the crane 11 is the object of container handling operation, the spreader 29 is thrust rightwardly.

Figure 9:
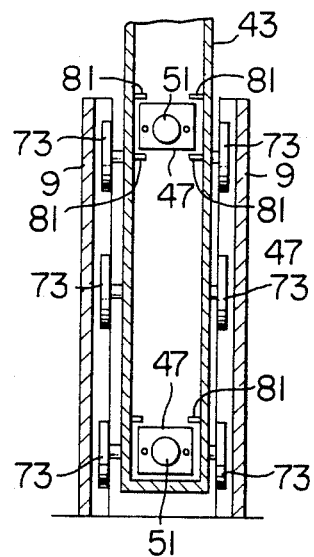
FIG. 9 is a cross sectional view taken along the line IX—IX in FIG. 7.

The embodiment of the invention described hereinabove offers the following economical advantages:

(1) The crane 11 is not supported by the shelf 1 thereby eliminating the need to increase the strength of the shelves 1;

(2) The spreader frame 43 is never completely separated from the elevating member 25, so that movement of the spreader 29 between the shelf 1 and the elevating member 25 can be effected without any shock and the container 7 can be placed on and removed from the shelf 1 at high speed;

(3) The spreader 29 can be hitched on to the container 7 by the twist lock pins 51 which move in twist rotation. This eliminates the need to provide a space for performing the hitching operation above each shelf 1;

(4) The direction in which the spreader frame 43 is thrust is in alignment with the minor axis of the container 7. Thus, the spreader frame 43 need not be extended a great distance and the operation of placing the container 7 on the shelf 1 or removing same therefrom can be performed quickly;

(5) As shown in FIGS. 7 and 9, the spreader frame 43 is in the form of an inverted letter U in cross section and the brackets 47 are located inside the inverted letter-U-shaped frame, with the brackets 43 being guided in its downward movement by guide plates 81 secured to the spreader frame 43 to extend vertically. By this arrangement, wobbling of the brackets 47 in a horizontal two-dimensional direction is arrested by the guide plates 81 and spreader frame 43. This facilitates positioning of the twist lock pins 51 with respect to the slots 77 and vibration of the container 7 hung by the spreader 29 can be minimized. This allows the container 7 to be quickly placed on and removed from the shelf 1;

(6) When the container 7 is suspended from the shelf 1, it is not necessary to move the entire spreader 29 vertically. This makes the installation economical because the container 7 can be suspended and lifted or deposited smoothly and quickly; and (7) The distance essentially covered by the movement of the spreader 29 until it is positioned above the container 7 is substantially equal to the sum of the distance covered by the movement of the crane 11 on the rails 13 and the distance covered by the movement of the spreader frame 43 on the guide rails 9.

When the guide rollers 73 of the spreader frame 43 are transferred from the side of the elevating member 25 to the small width guide rails 9, it is necessary to perform the operation with care, so that there have been limits placed on increasing the speed of movement of the spreader frame 43. This has made it necessary to take time for moving the spreader 29 to a position above the container 7 after the movement of the crane 11 is interrupted. Meanwhile the crane 11 can be moved at high speed because there is no transfer problem. Thus, it is possible to shorten the time required for handling the container 7 for moving same between the shelf 1 and the destination by placing the container 7 on the shelf 1 or removing same therefrom by aligning the major axis of the container 7 with the length of the rails 13 because this allows the length of the zone in which speedup of operation is difficult to achieve to be reduced.

For thrusting the spreader frame 43 from the elevating member 25 toward the shelf 1, means for moving the spreader frame 43 from the elevating member 25 by pushing or pulling by using piston cylinder means may be used. The spreader frame 43 may be movably supported on the guide rails 9 and 41 by means provided for moving the spreader frame 43 in sliding movement toward and away from the shelf 1 by using a slide plate, in place of the guide rollers 73, mounted between the spreader frame 43 and the guide rails 9 and 41.

Figure 10:
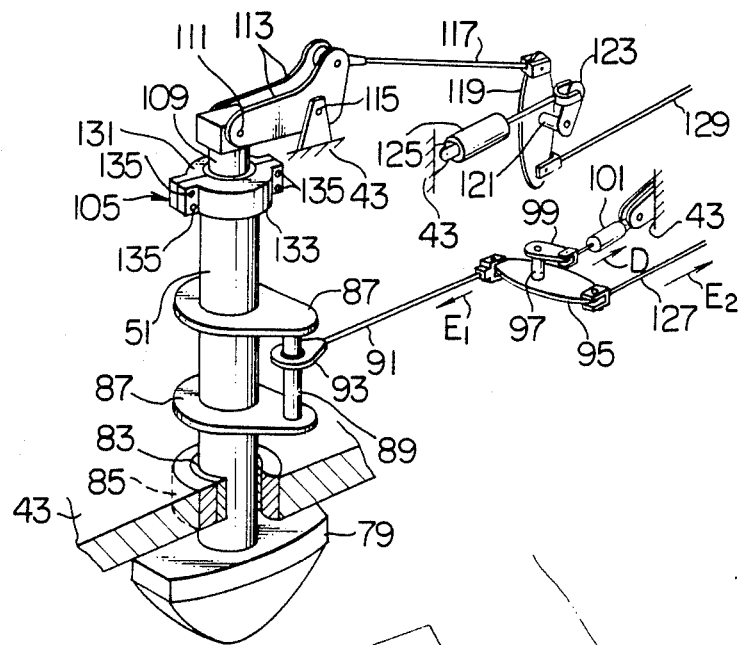
FIG. 10 is a perspective view of the container shed storage installation comprising another embodiment, showing the drive means for the twist lock pin.
Figure 11:
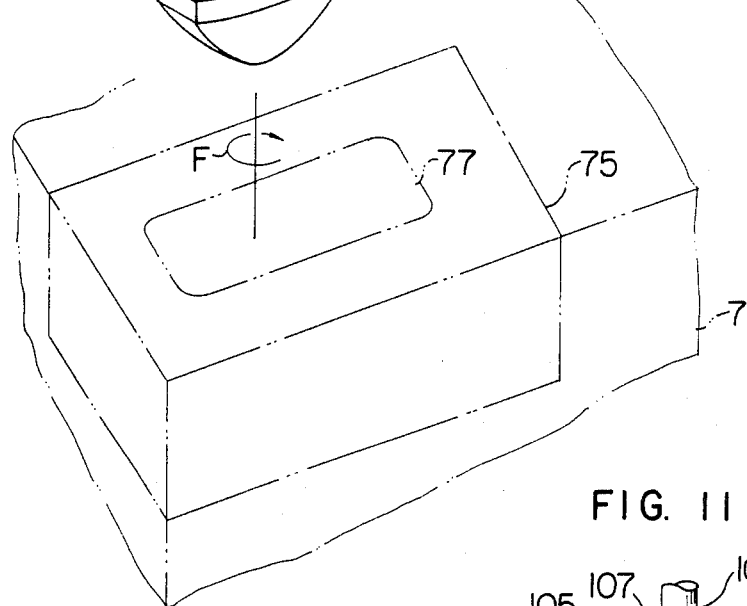
FIG. 11 is a vertical cross sectional view of portions of the embodiment shown in FIG. 10.
Figure 11:
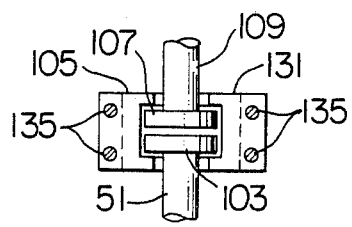

Another embodiment of the invention comprises drive means for moving the twist lock pins 51 vertically and in twist rotational movement is shown in FIGS. 10 and 11 distinct from the corresponding means of the embodiment shown and described hereinabove.

The drive means shown in FIGS. 10 and 11 comprises a boss 85 having a bush 83 mounted on the spreader frame 43, the bush 83 having one of the twist lock pins 51 extending therethrough for movement in vertical sliding movement and rotational movement. Each twist lock pin 51 has an arm 87 secured thereto and having connected to its projecting end a vertical connecting pin 89 which has one end of a rod 91 connected thereto for movement in vertical sliding movement and rotational movement, the rod 91 being connected at the other end thereof through a pin to one end of a horizontal lever 95. The lever 95 has connected to its central portion a rotary shaft 97 having connected at its upper end an arm 99 having connected to its projecting end a piston rod of piston-cylinder means 101 connected at its cylinder tail to the spreader frame 43.

Each twist lock pin 51 has secured to its upper end as shown in FIG. 11 a flange 103 located in a bracket 105 for rotation. The bracket 105 has located therein another flange 107 for rotation secured to a lower end of a support shaft 109 having connected to the other end thereof a shaft 11 one end of a lever 113 of the L-shape connected midway between opposite ends thereof through a shaft 115 to the spreader frame 43 for vertical pivotal movement, the lever 113 being connected at the other end thereof to one end of a rod 117. The rod 117 is connected at the other end thereof to one end of a vertical lever 119 connected at its central portion to the spreader frame 43 through a rotary shaft 121 having an arm 123 secured thereto. The arm 123 has connected thereto at the other end thereof a piston rod of piston-cylinder means 125 connected at its cylinder tail to the spreader frame 43. The lever 95 is connected at the other end thereof to another twist lock pin 51 attached to the same spreader frame 43 in the same manner as described by referring to FIG. 10. The lever 119 is connected at the other end thereof to one end of a rod 129 connected at the other end thereof to another twist lock pin 51 attached to the same spreader frame 43 in the same manner as described by referring to FIG. 10.

In the embodiment of FIGS. 10 and 11 described hereinabove, a bracket element 131 on the right side and a bracket element 133 on the left side are connected together by bolts 135 while the flanges 103 and 107 are held therebetween, to constitute the bracket 105.

In the embodiment of FIGS. 10 and 11 of the aforesaid construction, when the arm 123 is pulled by actuating the piston-cylinder means 125, the lever 119 moves in pivotal movement counterclockwise in FIG. 10 and pushes the rods 117 and 129. This causes the lever 113 to move in pivotal movement in a direction in which the bracket 105 moves downwardly along with the twist lock pin 51. Downward movement of the twist lock pin 51 makes the lock portion 79 of the twist lock pin enter the slot 77 at one of the corner metal members 75 of the container 7. Thereafter, as the piston-cylinder means 101 is actuated to pull the arm 99 in the direction of an arrow D, the lever 95 moves in pivotal movement counterclockwise to push the rods 91 and 127 in the directions of arrows $E_1$ and $E_2$ respectively. This causes the arm 87 to rotate, to make the twist lock pin 51 rotate in its position. This causes the lock portion 79 to rotate through 90 degrees in the direction of an arrow F while the latter is located in the slot 77, to thereby prevent dislodging of the lock portion 79 from the slot 77 at the corner metal member 75. Then the piston-cylinder means 125 is actuated to push the arm 123. This causes the lever 119 to move clockwise in pivotal movement to withdraw the rods 117 and 119, so that the lever 113 moves in pivotal movement about the shaft 115 in a direction in which the support shaft 109 is moved upwardly. This moves the bracket 105 and the twist lock pin 51 upwardly, to enable the container 7 to be lifted as the twist lock pin 51 is hitched on to the container 7.

In the embodiment of FIGS. 10 and 11, the bush 83 performs the function of suppressing horizontal vibration of the twist lock pin 51 with respect to the spreader frame 43, to thereby prevent vibration of the container 7 and vibration of the twist lock pin 51 itself.

In the embodiment of FIGS. 10 and 11, the bracket 105 is more compact in size and lighter in weight than the bracket 47 of the first embodiment and the need to move the drive means for the twist lock pin 51 in the vertical direction is eliminated. Thus, the embodiment of FIGS. 10 and 11 offers, in addition to the advantages described hereinabove, the advantage that the operation of moving the twist lock pin 51 upwardly and downwardly can be performed smoothly with a low force.

Also, in the embodiment of FIGS. 10 and 11, the need to provide the spreader frame 43 with a cross-sectional shape of an inverted U form is eliminated because the vibration of the twist lock pin 51 in the horizontal direction is prevented from occurring by the bush 83.

The present invention can achieve the additional economical effects:
(1) There is no need to greatly increase the strength of the shelves and the crane, since the container can be moved into and out of the shelf without imparting the high load of the crane to the shelf and without giving a high tumbling moment to the crane;
(2) A lifting of the container can be effected quickly by a smoothly performed operation without requiring a high vertically acting force since lifting of the container above the shelf can be effected without relying on vertical movement of the spreader frame; and
(3) The shelves can be made compact in size due to the fact that the spreader frame of a large size need not be moved vertically above the narrow shelf and that the need to set above the shelf a space for operating engaging members can be eliminated, since the engaging members for the container comprise twist lock pins requiring no large space for performing engaging operations, which lock pins are adapted to move in vertical movement and twist rotational.

What is claimed is:

1. A container storage shed installation for storing containers comprising:
   rails laid on a floor;
   shelves on said floor, each of said shelves having a plurality of container storage zones arranged horizontally and vertically along said rails;
   a crane movably supported on said rails;
   an elevating member on said crane for effecting a vertical elevating movement;
   a spreader frame mounted on said elevating member for movement in a horizontal direction toward said shelves;
   brackets on the spreader frame capable of moving vertically;
   twist lock pins each twistably attached to one of said brackets;
   guides located horizontally on each of said shelves for permitting a horizontal movement of said spreader frame while preventing a a downward movement of said spreader frame;
   wherein each of said twist lock pins is connected to a motor through a gear, said motor being mounted on said bracket suspended from said spreader frame through piston-cylinder means; and
   wherein said spreader frame is in the form of an inverted substantially U-shaped member for enclosing said brackets at one side thereof, said spreader frame having attached to an inner side thereof a plurality of guide plates arranged in face-to-face relationship to said bracket for guiding the same for movement in a vertical direction.

2. A container storage shed comprising:
   a plurality of shelves for supporting the containers in such a manner that lengths of the container are oriented in a direction of movement of a crane;
   a pair of guides located horizontally at opposite sides of an upper space of each of sid shelves to extend from a front end to a rear end;
   an elevating member mounted on said crane for vertical elevating movement along a front surface of each of said shelves;
   a spreader frame having two arms extending from said elevating member toward each of said shelves for movement along said pair of guides; and
   a plurality of twist lock pins each attached to said spreader frame at positions corresponding to positions of two suspended portions of the crane spaced apart widthwise at either end of each of said containers wherein each of said twist block pins mounted on said spreader frame is connected to a motor means through a gear means, piston-cylinder means are provided for suspending said motor means from said spreader frame; and
   wherein said spreader frame is in the form of an inverted U-shaped member having attached to an inner side thereof a plurality of guide plate means arranged in a face-to-face relationship with a vertically moving bracket means accommodating the motor means for guideing the vertical movement of the bracket means.

* * * * *